Aug. 28, 1923.
T. C. ALLISON
1,466,328
AUTOMATIC SAW SET
Filed April 26, 1922
2 Sheets-Sheet 1
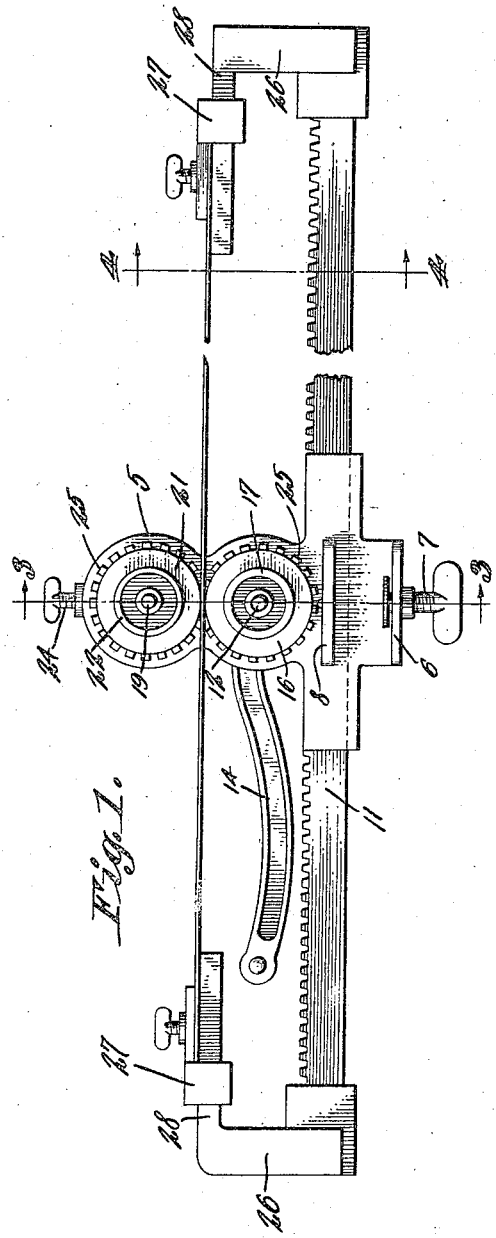
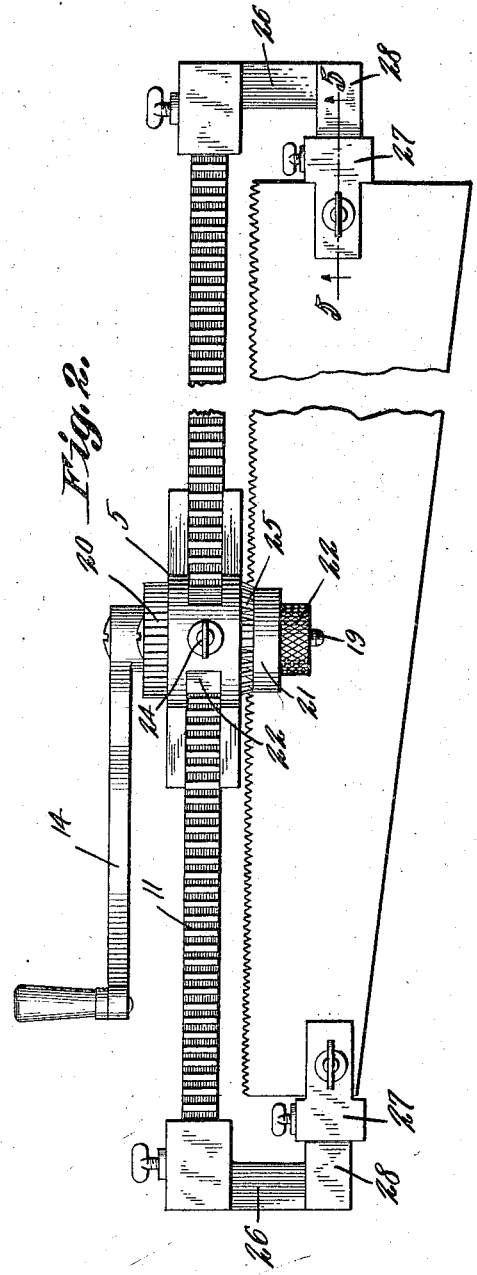
Inventor
T. C. Allison.
By C. A. Snow & Co.
Attorneys.

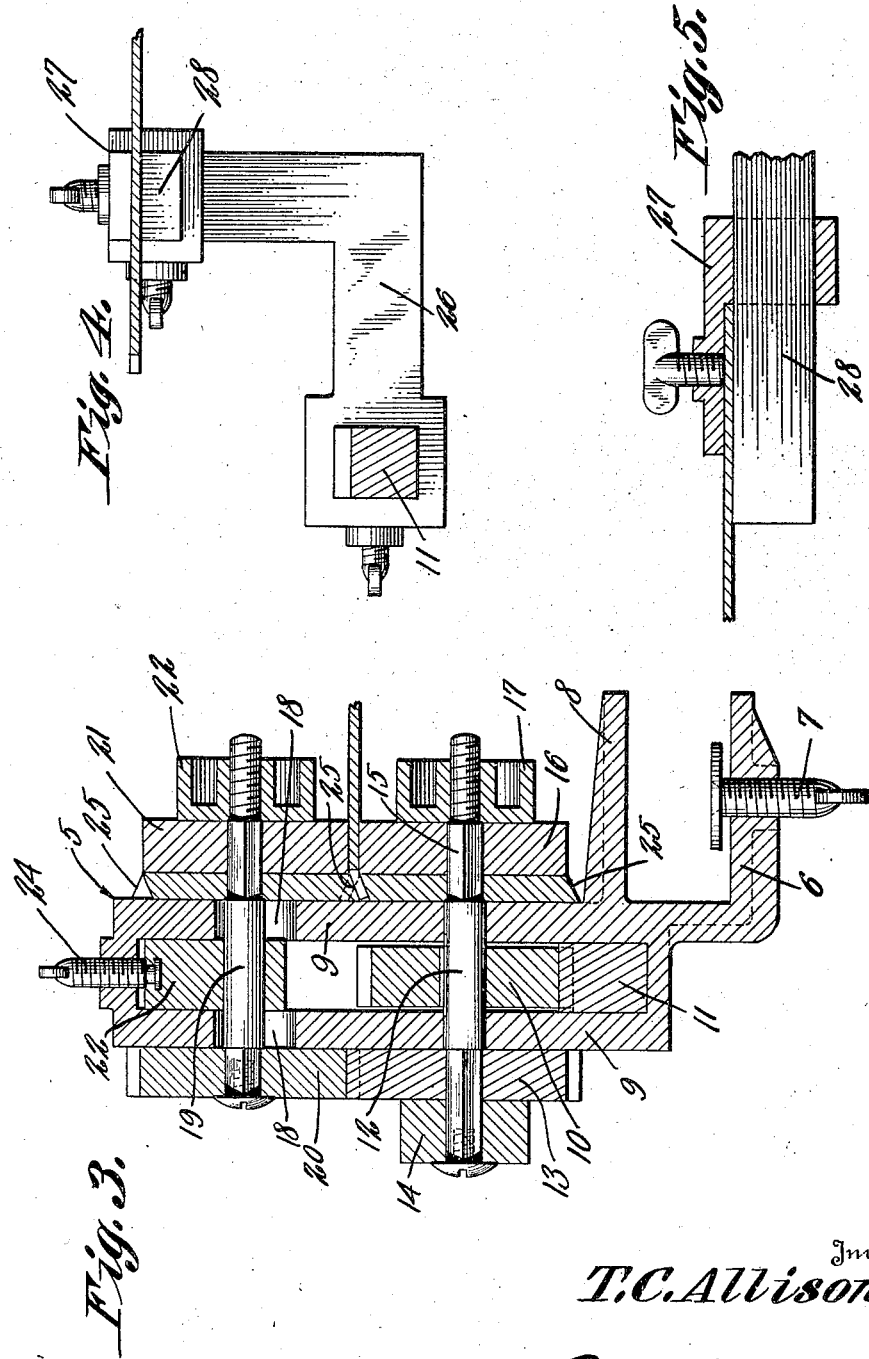

Patented Aug. 28, 1923.

1,466,328

UNITED STATES PATENT OFFICE.

THOMAS COOPER ALLISON, OF HOHENWALD, TENNESSEE.

AUTOMATIC SAW SET.

Application filed April 26, 1922. Serial No. 556,611.

*To all whom it may concern:*

Be it known that I, THOMAS COOPER ALLISON, a citizen of the United States, residing at Hohenwald, in the county of Lewis and State of Tennessee, have invented a new and useful Automatic Saw Set, of which the following is a specification.

This invention relates to saw setting machines, the primary object of the invention being to provide means for moving a saw under operation between the setting rollers of the machine.

Another object of the invention is to provide means for accomplishing the setting result by a single operation.

A still further object of the invention is to provide means for setting the teeth of a saw by even pressure, thereby reducing the chances of breaking the teeth of the saw to a minimum.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a side elevational view of a saw setting machine constructed in accordance with the present invention.

Figure 2 is a plan view thereof.

Figure 3 is a sectional view taken on line 3—3 of Figure 1.

Figure 4 is a sectional view taken on line 4—4 of Figure 1.

Figure 5 is a sectional view taken on line 5—5 of Figure 2.

Referring to the drawings in detail, the reference character 5 designates the body portion of the machine which is formed with an arm 6 at the lower end thereof, which arm is formed with a threaded opening to accommodate the thumb screw 7 cooperating with the jaw 8 for clamping the machine to a suitable supporting structure.

The body portion 5 embodies spaced walls 9 between which operate the gear 10 and rack bar 11, the rack bar moving over the lower wall of the body portion 5, and contacting with the teeth of the gear 10, whereby movement of the gear 10 produces a relative movement of the rack bar for purposes to be hereinafter more fully described.

A shaft 12 extends through the side walls of the body portion 5 and has a squared extremity accommodating the pinion 13 and operating handle 14. The opposite end of the shaft 12 extends beyond the opposite wall of the body portion and is formed with a squared portion 15 to accommodate the setting rollers 16, a securing nut 17 being threaded on the shaft to secure the setting roll 16 in position.

Formed in the walls 9 of the body portion at a point adjacent to the upper end of the body portion are elongated openings 18 which accommodate the shaft 19 that has its ends extending beyond the side walls of the housing, the inner end of the shaft supporting the pinion 20, while the outer end thereof supports the setting roller 21 which is held to the shaft by means of the securing nut 22.

This shaft 19 is mounted in the movable bearing 23, which moves between the walls 9 of the body portion 5. A winged screw 24 extends through a suitable threaded opening in the upper wall of the body portion, and is formed with a head fitted in a suitable opening in the movable bearing 23, so that by movement of the winged screw, the bearing may be moved vertically to move the setting rollers into setting relation with each other, on opposite sides of the saw blade under operation.

Each of the setting rollers is formed with teeth 25 formed in the periphery thereof, the wall formed between the teeth, being inclined towards the center of the roller to provide a clearance for a tooth of the adjacent setting roller, to permit the tooth to bend a saw tooth into the cut out portion.

Brackets 26 are secured to the opposite ends of the rack bars, each bracket being formed with an adjustable section 27 adjustable on the arm 28. Clamping members are carried by the adjustable sections 27 for clamping a saw blade therebetween, the saw blade being however in such position as to bring the teeth thereof between the setting teeth of the rollers 16 and 21.

In the operation of the device, as the handle 14 is operated, the gears 13 and 10 are operated, the gear 10 moving the rack bar 11, together with the saw supported thereby, longitudinally of the supporting surface on which the machine is positioned.

The gear 13 transmits motion to the pinion 20 which in turn transmits motion to the rollers 16 and 21 to the end that a saw, which is supported between the rollers 16 and 21 is engaged by the teeth of the rollers setting the teeth.

When the teeth of the saw have been properly set, the screw 24 is operated to move the shaft 19 together with the roller and pinion supported thereon, upwardly, providing a clearance between the rollers 16 and 21 and permitting the saw to be readily removed from the machine.

Having thus described the invention what is claimed as new is:—

In a saw setting machine, a rack bar, bracket members adjustably secured at the ends of the rack bar, each of said bracket members including an inwardly extended arm disposed in parallel relation with the rack bar, clamps adjustably supported on the inwardly extended arms, said clamps adapted to engage the ends of a saw blade, a body movable over the rack bar and including a pair of spaced walls, setting rollers carried by the body, gearing mounted between the walls, shafts for supporting the gearing and setting rollers, said gears meshing to cause rotation of the setting rollers, and one of said gears moving over the rack bar to cause the body to move longitudinally of the rack bar.

In testimony that I claim the foregoing as my own, I have hereto affixed my signature in the presence of two witnesses.

THOMAS COOPER ALLISON.

Witnesses:
W. T. STARBUCK,
SCOTT A. JONES.